ly Patented Jan. 2, 1968

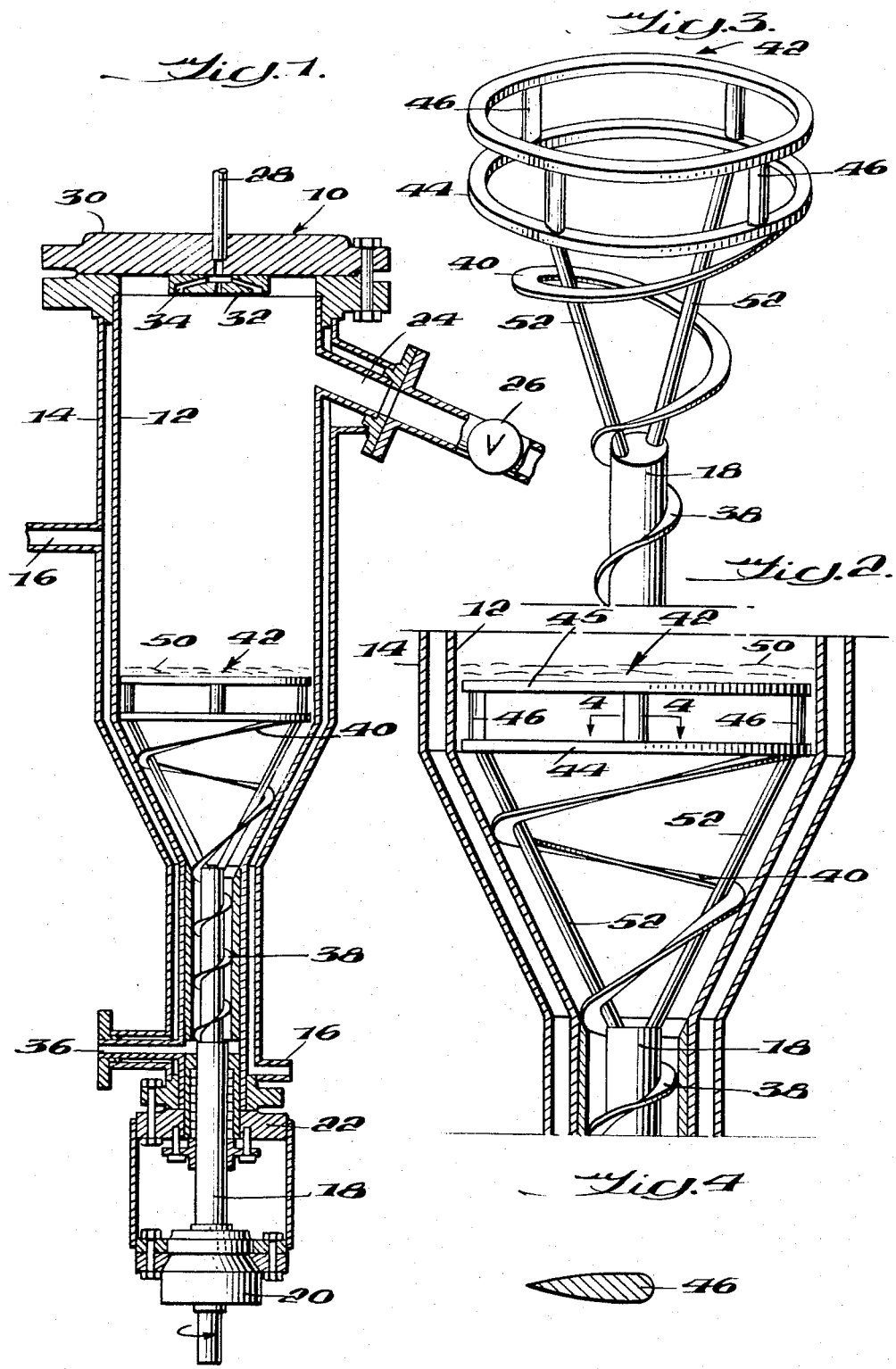

3,361,537
POLYMER FINISHING APPARATUS
Nick Angelo Ferrante, Richmond, Va., assignor to E. I. du Pont de Nemours and Company, Wilmington, Del., a corporation of Delaware
Filed May 12, 1965, Ser. No. 455,178
3 Claims. (Cl. 23—283)

This invention relates to an apparatus for converting a liquid of low viscosity into a liquid of high viscosity by removal of a volatile material, being particularly adapted for polycondensation reactions in which volatile material is removed and a polymeric material of high viscosity is produced which remains in a liquid state at the temperature prevailing during the reaction.

The commercial preparation of most linear condensation polymers such as polyamides or polyesters involves heating monomeric starting materials to cause progressive condensation with loss of low molecular weight volatile material until the desired molecular weight level is achieved. The process is usually carried out in two or more stages with intermediate formation of a low molecular weight, low viscosity polymeric liquid which is then passed through finishing vessels which are maintained at proper temperatures and low pressures.

The problems associated with the proper design of polymer finishers have been recognized and described in the prior art. A finisher such as that illustrated by Li in FIG. 4 of U.S. Patent No. 3,113,843 functions to produce polymer with uniform viscosity. However, it has been found that the spiral ribbon propagates a wave of polymer as the leading edge proceeds through the melt, thus causing the polymer level to rise and fall with each rotation of the agitator. As a consequence, polymer clings to the wall of the finisher and is exposed for an extended period of time to the low pressure vapor phase. This excessive exposure allows polymerization and thermal degradation to proceed at the "beach line" formed, thus casing a ring of polymer gel 2½ to 3 inches wide to form about the periphery of the vessel directly above the melt surface. The ring of gel builds up in time to such an extent that portions break loose, drop into the melt and are carried off into the polymer stream. The gel slough is subsequently subdivided into smaller particles as it passes through the various downstream pumps and ultimately is fed to the spinning machine where it causes serious discontinuities. The gel slogh problem is a critical one which frequently occurs within a 20 to 30 day operating period, without warning. To avoid the effects of gel sloughs, finishers must be cleaned at rather frequent intervals. This is costly and, since a slough cannot be predicted, a scheduled finisher clean-up often fails to avert a process upset. Finisher process life in general averages approximately 25 days with frequent incidences of gel sloughs.

It is, therefore, the object of this invention to provide an improved polymer finishing apparatus which is particularly useful for preparing high viscosity polymer and with which gel formation above the melt surface is reduced substantially.

This object is accomplished in a finishing apparatus of the type which includes an upright cylindrical polymerization vessel having an inlet for liquid near its upper end, an outlet for liquid adjacent its bottom, an outlet for vapor near its upper end and a spiral transfer means including a screw mounted for rotation within the vessel. The improved transfer means has a cylindrical cage with upper and lower annuli held in spaced relationship to each other by a plurality of radially, spaced, aerodynamically shaped struts fastened between the annuli. The diameter of the cage is slightly less than the inside diameter of the cylindrical section of the vessel. A spiral ribbon flight supports the cage and extends to the rotatably driven screw.

Other objectives and advantages will become apparent in the following specification wherein reference is made to the drawing in which FIGURE 1 is an elevational section of a finishing apparatus into which the cage structure of the present invention has been incorporated;

FIG. 2 is a fragmentary enlargement of the structure shown in FIG. 1;

FIG. 3 is a fragmentary perspective view; and

FIG. 4 is a sectional view taken on line IV—IV in FIG. 3.

The apparatus embodiment chosen for purposes of illustration has been designated generally at 10. It includes an upright tubular vessel 12 surrounded by a heating jacket 14 equipped with supply and return nozzles 16 in communication with an external supply of a suitable heat transfer medium. A shaft 18 extends through the bottom of vessel 12 and below the point of entry is journaled in a bearing 20 forming part of a support assembly 22 which closes off the lower end of vessel 12 and heating jacket 14. An exhaust port 24 is provided at the upper end of vessel 12 with the port being connected to a valve 26. A polymer inlet pipe 28 extends through flanged cover 30 and terminates in a distribution head 32. Passageways 34 in distribution head 32 communicate with inlet pipe 28 and the interior of vessel 12. A polymer discharge port 36 is provided at the lower end of the vessel.

As illustrated, vessel 12 narrows from its maximum diameter defined as a separation zone to its minimum diameter defined as a transfer zone to define an intermediate, frusto conical, feed zone. A screw 38 is formed on shaft 18, as shown, in the transfer zone. A spiral ribbon flight 40 is attached to the end of shaft 18 and is within the area defined as the feed zone. Flight 40 terminates in a cage structure 42 at the bottom of the separation zone.

Cage structure 42 includes spaced rings or annuli 44, 45 connected by vertical struts 46. Struts 46 have a streamlined aerodynamic shape, as shown in FIG. 4, to minimize disturbance of the polymer level 50 as cage 42 moves through the melt pool. The diameter of cage 42 is only slightly less than the major diameter of vessel 12. Annulus 44 is fastened to the upper end of spiral flight 40 and is further supported from shaft 18 by rods 52 which also serve to strengthen flight 40.

In operation, the finishing apparatus 10 is maintained at an interior temperature above the polymer melting point by circulating a heat transfer medium through jacket 14. Liquid polymer is introduced through head 32 and falls to the melt pool. In passing through distributor head 32, the polymer is divided into several paths in order to increase the exposed surface area as it falls through the separation zone where steam diffuses from the polymer and passes out vent port 24. The melt level 50 is maintained slightly above annulus 45. Shaft 18 is driven in the direction indicated (FIG. 1) by a drive means (not shown) suitably connected to its lower end. Polymer is continuously scraped from the vessel wall by cage 42 and spiral flight 40 and urged downwardly into the feed zone by flight 40. The polymer is compressed, voiding any remaining steam, fed through the transfer zone and uniformly discharged from finisher 10 through pipe 36 by screw 38, the action and fitting of which also serve as an exit seal.

In accordance with the invention, open cage structure 42 performs an important function in reducing areas of stagnation in which degradation of polymeric liquid may occur in that rings 44, 45 stabilize the melt pool surface level, thereby reducing the tendency of the spiral flight to push waves of liquid up the wall of the vessel. Such a wave action, as previously described, results in a beachline of degraded polymer which builds up then breaks loose, drops into the polymer melt and adversely affects polymer quality. In addition, the cage structure and spiral flight rotate with the cylindrical vessel with relatively close tolerances all around and in effect constantly wipe the entire wall of the vessel, thus precluding stagnation of the polymeric liquid below the melt level. Use of aerodynamically-shaped struts 46 in the cage structure is highly advantageous because of their smooth uniform action in wiping the vessel without a tendency to push waves of liquid up on the wall.

*Example*

An apparatus similar to that shown in the drawing was installed and used continuously for forty-five days in the production of polyhexamethylene adipamide. Internal inspection of the finisher after this extended run showed a significant reduction in the width of the polymer gel "beachline" to ¾ inch from previously experienced widths of 2½ to 3 inches. During the forty-five day run, no polymer gel sloughs as evidenced by adversely affected polymer properties and quality were experienced.

The apparatus disclosed herein is useful in the production of high viscosity polyamides in a rapid and continuous manner and permits appreciable saving in the finishing operation. Aside from its use in continuous polyamide reactions, the apparatus has general utility in the separation of volatile materials from any viscous liquid or semiesolid, especially those subject to thermal degradation. Other advantages will occur to those skilled in the art without departure from the invention which is accordingly intended to be limited only by the scope of the appended claims.

Having thus described the invention, what is claimed as new and desired to be secured by Letters Patent is:

1. A polymer finishing apparatus comprising: an upright tubular vessel having an outlet adjacent the bottom thereof; a transfer screw having a drive shaft extending through said bottom; a spiral ribbon flight extending upwardly from said screw; and an open cage structure attached to and supported by the flight, said structure including a pair of horizontally disposed, spaced annuli peripherally proximal to said vessel and a plurality of radially spaced, streamlined struts interconnecting said annuli.

2. A finishing apparatus comprising: an upright closed vessel having, from top to bottom, separation, feed and transfer zones; inlet conduit means communicating with said separation zone for the admission of molten nylon; transfer means including a driven shaft extending through the bottom of said vessel, a screw on said shaft in said transfer zone for moving nylon downwardly therethrough and a spiral flight attached to and extending upwardly from said shaft in the feed zone; an open cage structure supported by the flight for rotation therewith, in the separation zone, said structure including a pair of horizontally disposed, equidimensional, spaced annuli peripherally proximal to said vessel and a plurality of radially spaced, vertically disposed, streamlined struts interconnecting annuli, there being a restricted exhaust port located adjacent the top of said vessel for vapor separated from the nylon and an outlet adjacent the bottom of said vessel for receiving finished molten nylon from said screw.

3. In a finishing apparatus including an upright vessel having an outlet adjacent the bottom thereof and spiral transfer means therein for discharging a viscous material through said outlet, an open cage structure supported by said transfer means, said structure comprising a pair of horizontally disposed, spaced annuli peripherally proximal to said vessel and a plurality of radially spaced, streamlined struts interconnecting said annuli.

References Cited

UNITED STATES PATENTS 3,113,843  12/1963  Li _____ 23—285
3,183,553  5/1965  Slater _____ 18—12

JAMES H. TAYMAN, JR., *Primary Examiner.*